United States Patent [19]
Palmer et al.

[11] 4,432,684
[45] Feb. 21, 1984

[54] THREADED MEMBERS

[75] Inventors: John P. Palmer, Basingstoke; Neil P. Blackburn, Winchester, both of England

[73] Assignee: ITW Limited, Windsor, England

[21] Appl. No.: 286,120

[22] Filed: Jul. 23, 1981

[30] Foreign Application Priority Data

Jul. 25, 1980 [GB] United Kingdom ............... 8024464

[51] Int. Cl.³ .......................................... F16B 27/00
[52] U.S. Cl. ................................ 411/366; 411/437; 411/412; 411/432
[58] Field of Search .............. 411/366, 427, 436, 437, 411/432, 433, 373, 411, 423, 8, 412

[56] References Cited

U.S. PATENT DOCUMENTS

| | | | |
|---|---|---|---|
| 1,825,419 | 9/1931 | Plym | 411/411 |
| 4,231,247 | 11/1980 | Haydon | 411/411 |
| 4,341,485 | 7/1982 | Appleby et al. | 411/362 X |

FOREIGN PATENT DOCUMENTS 47-45973 11/1972 Japan ................................ 411/411

*Primary Examiner*—Wayne L. Shedd
*Attorney, Agent, or Firm*—Trexler, Bushnell & Wolters, Ltd.

[57] ABSTRACT

A threaded member has an external helical thread 18a presenting a crest 24 of spiral outline whose trailing end is in the form of an abutment 26 for resisting withdrawal from a resiliently deformable workpiece. In a preferred application, the threaded member is a die-cast grub screw S and locates within a hinged plastics furniture fastener F. Advancing the grub screw S by ½-turn from its initial position in the fastener F breaks a frangible locating web 28 and allows the abutment 26 to pass an abrupt shoulder 64. This gives a tangible warning to the user that a ridge 12b on the grub screw S is correctly located beneath a head H of an anchor A.

9 Claims, 7 Drawing Figures

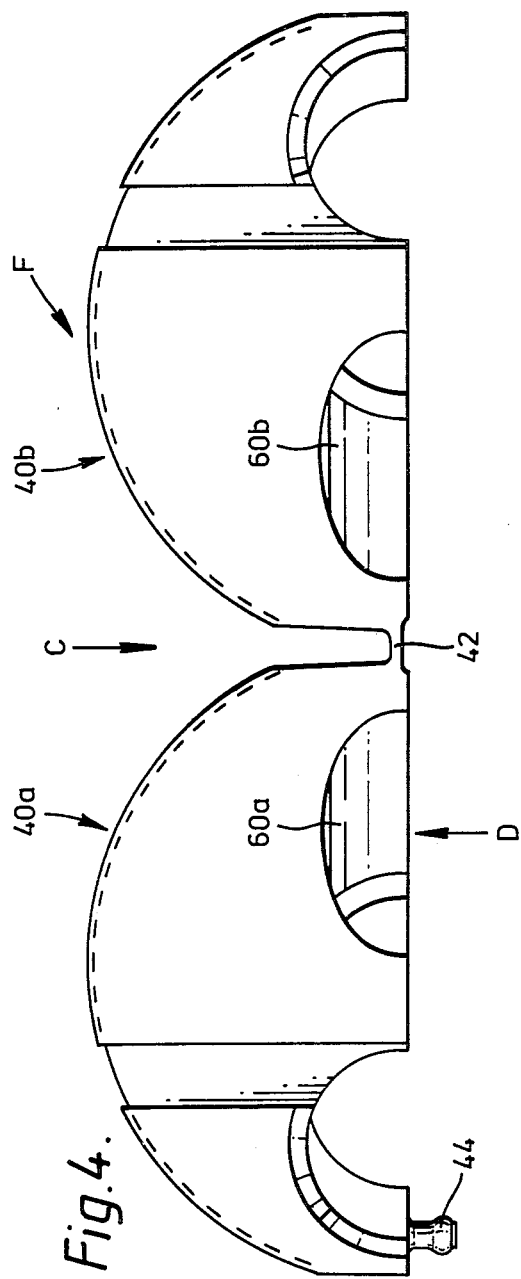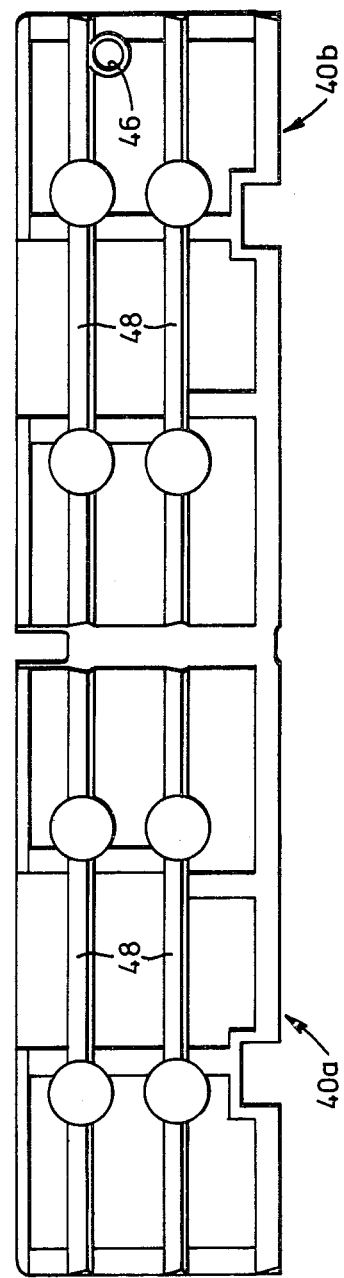
Fig.4.
Fig.5.

THREADED MEMBERS

The present invention relates to threaded members which are particularly suitable for use as grub screws, such as may be required in the assembly of knock-down furniture, but which are also expected to be suitable for use in more general applications.

According to the present invention, a threaded member comprises an elongate shank having an external helical thread presenting a crest whose radial separation from a longitudinal axis of the shank is less at a leading end of the thread than at a trailing end of the thread which is in the form of an abutment.

The outline of the crest, when viewed from an end of the shank, must clearly be non-circular and/or non-concentric with the longitudinal axis of the shank.

Preferably, the radial separation of the crest from the longitudinal axis of the shank never decreases during movement along the crest away from the leading end of the thread.

More preferably, the radial separation of the crest from the longitudinal axis of the shank progressively increases along the entire length of the crest as the abutment at the trailing end of the thread is approached.

The rate of the progressive increase may be uniform so that the crest presents a spiral outline. The crest may present a semi-circular outline, however, which is offset from the longitudinal axis of the shank.

The elongate shank may have leading and trailing ends respectively located closely adjacent to the leading and trailing ends of the thread.

The leading end of the shank may be formed with thread cutting means, but is preferably shaped to facilitate use as a grub screw. The trailing end of the shank may be formed with a radially enlarged head, but is preferably shaped to facilitate application of torque thereto. It is possible for the threaded member to be double-ended, in the sense that its leading end is the same as its trailing end, each of said ends presenting for example both a chamfered end face and a shaped recess therein.

The abutment formed by the trailing end of the thread may extend approximately vertically, i.e. radially of the longitudinal axis of the shank, preferably ending substantially normal to the mean helix of the thread at that end, but the abutment may slope outwardly at other angles, and indeed may slope inwardly to present an undercut or overhang.

The crest of the thread may be sharp, but is preferably formed as an intermediaie face joining leading and trailing faces of the thread, each of said leading and trailing faces again sloping slightly outwardly to make a small angle with the vertical, and the area of said trailing face of the thread being arranged to be comparable to that of known grub screws, for example, to permit the threaded member to exhibit a strong resistance to withdrawal by pulling.

The threaded member may be formed of any substantially rigid material, such as a metal, and a workpiece into which the threaded member is to be screwed may be formed of anything which is sufficiently resiliently deformable, such as a plastics material.

The external helical thread of the threaded member is intended, in fact, to be screwed completely into the resiliently deformable workpiece, which may or may not have been previously formed with an internal helical thread.

In the latter case, the action of screwing in the threaded member deforms the workpiece by different amounts at different positions along the length of the thread. A region of the workpiece immediately before the trailing end of the thread is thus necessarily deformed. However, a region of the workpiece immediately beyond the trailing end of the thread resiliently resumes or at least tries to resume its natural undeformed state. This discontinuity of deformation results in a shoulder being presented by the workpiece. If an attempt is made to screw the threaded member out of the workpiece, the abutment presented by the thread will press against the shoulder presented by the workpiece. This can provide a strong resistance to withdrawal by unscrewing.

Said resistance is significantly increased, for certain positions of the threaded member, if the workpiece is formed with a natural discontinuity, such as a slot or a rib, capable of presenting an abrupt shoulder against which the abutment on the threaded member can press.

If the workpiece has been previously formed with an internal helical thread, then in addition to positions of the threaded member which result in a shoulder formed by a discontinuity of deformation in the workpiece, there may be further positions of the threaded member in which the abutment can press against an abrupt shoulder separating respective sections of the internal helical thread in the workpiece which are each generally complementary in shape to the external helical thread on the threaded member, thereby again providing a particularly strong resistance to withdrawal by unscrewing.

Preferably, the arrangement is such that a user is able to tell when the abutment at the trailing end of the thread has just passed one of the abrupt shoulders. For example, the abrupt shoulder may be able to resume its natural undeformed state so quickly that there is an audible click. If the abrupt shoulder separates respective sections of an internal helical thread in the workpiece, each of said sections being complementary to the external helical thread on the threaded member, there will be a distinct and sudden decrease in the torque necessary to screw the threaded member into the workpiece, at the instant when the thread on the threaded member passes completely from one of said sections into the next. The user is thus given a tangible warning that the threaded member has been screwed a predetermined distance into the workpiece.

An example of when such a warning is particularly useful is when the threaded member is a grub screw formed of metal, and the workpiece is a hinged fastener formed of a plastics material. Such arrangements are well known in the assembly of knock-down furniture, where one end of the grub screw is to be located between a head and a collar on a wood screw, by screwing the grub screw along a threaded bore presented by the furniture fastener. In the absence of a warning that the grub screw has been fully screwed home, the user might continue to apply torque and could well strip the thread of the bore. With a warning, however, the user can be confident that he knows exactly when to stop applying torque to the grub screw.

There are thus two distinct, but interrelated, advantages resulting from the preferred provision of the abrupt shoulder, one advantage being that it gives a warning and the second advantage being that it then resists withdrawal by unscrewing, thereby firmly locking the threaded member in an optimum predetermined position with respect to the workpiece.

Although reference has been made so far to a single external helical thread on the shank of the threaded member, the shank may present one or more additional external helical threads. The threads may be of similar form or they may differ from one another. In particular, at least one of the additional threads may present a crest whose radial separation from the longitudinal axis of the shank remains constant. Moreover, the threads may be spaced sequentially along the shank, or may overlap one another along the shank. In particular, here may be two half-turn threads arranged to give a double-start.

Preferably, especially when the threaded member is a grub screw and the workpiece is a hinged fastener, a frangible web is provided which extends between the thread and an overlapping additional thread to facilitate initial location of the grub screw in the hinged fastener, the frangible web being broken in use.

A threaded member according to the present invention in the form of a grub screw, and its use in a furniture fastener, will now be described, by way of example only, with reference to the accompanying drawings, in which:

FIG. 4 is a plan view of the furniture fastener;

FIG. 5 is a side view taken in the direction of arrow C in FIG. 4;

Figure 1:
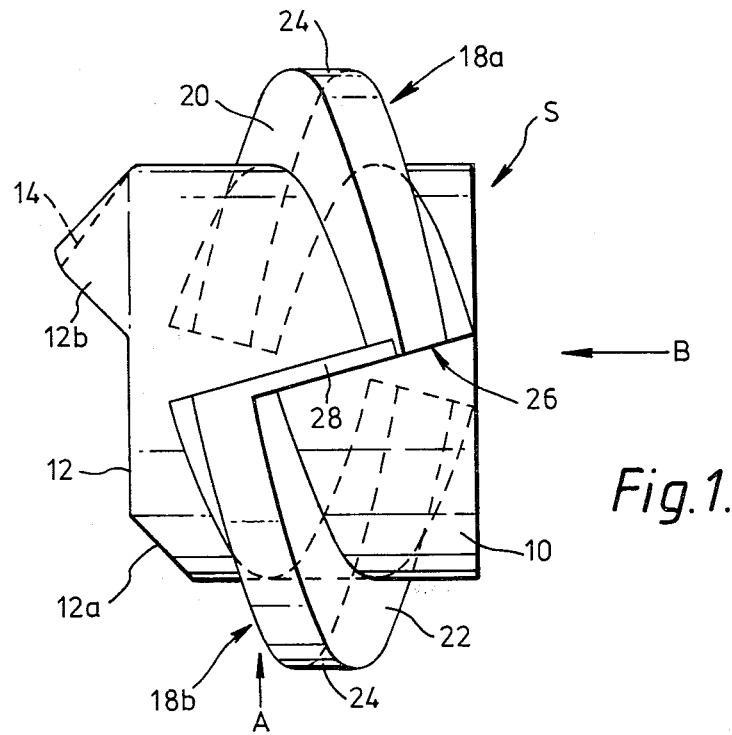
FIG. 1 is a side view of the grub screw.
Figure 2:
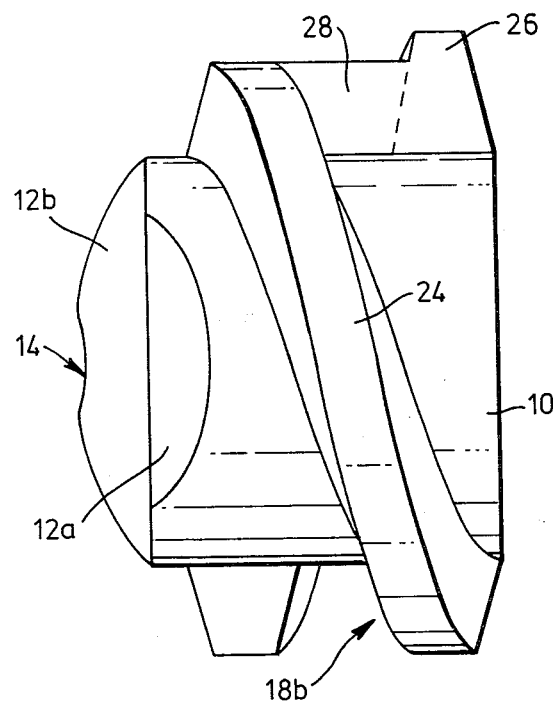
FIG. 2 is a side view taken in the direction of arrow A in FIG. 1.
Figure 3:
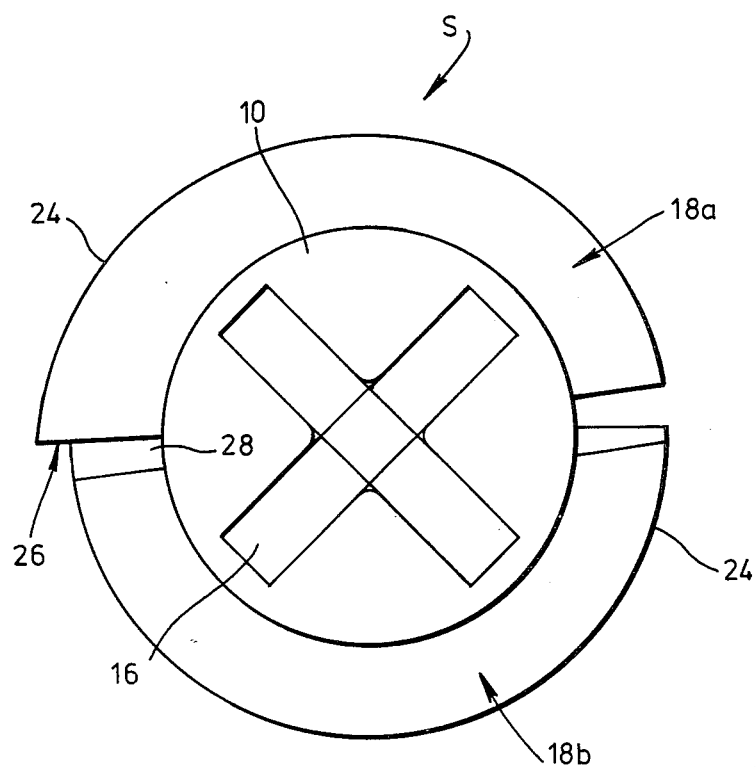
FIG. 3 is an end view taken in the direction of arrow B in FIG. 1.
Figure 6:
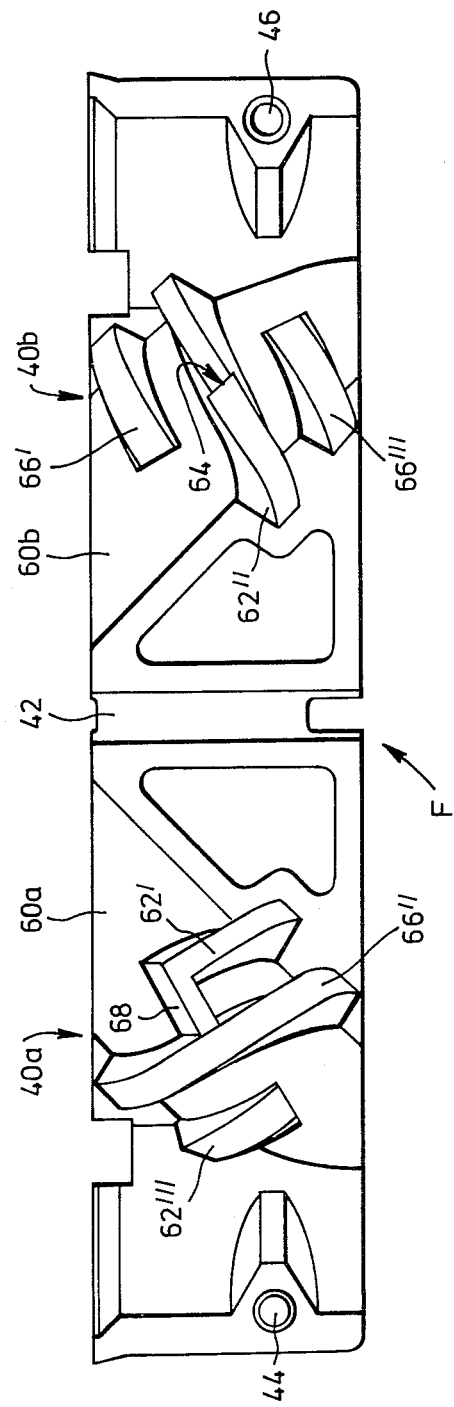
FIG. 6 is a side view taken in the direction of arrow D in FIG. 4.
Figure 7:
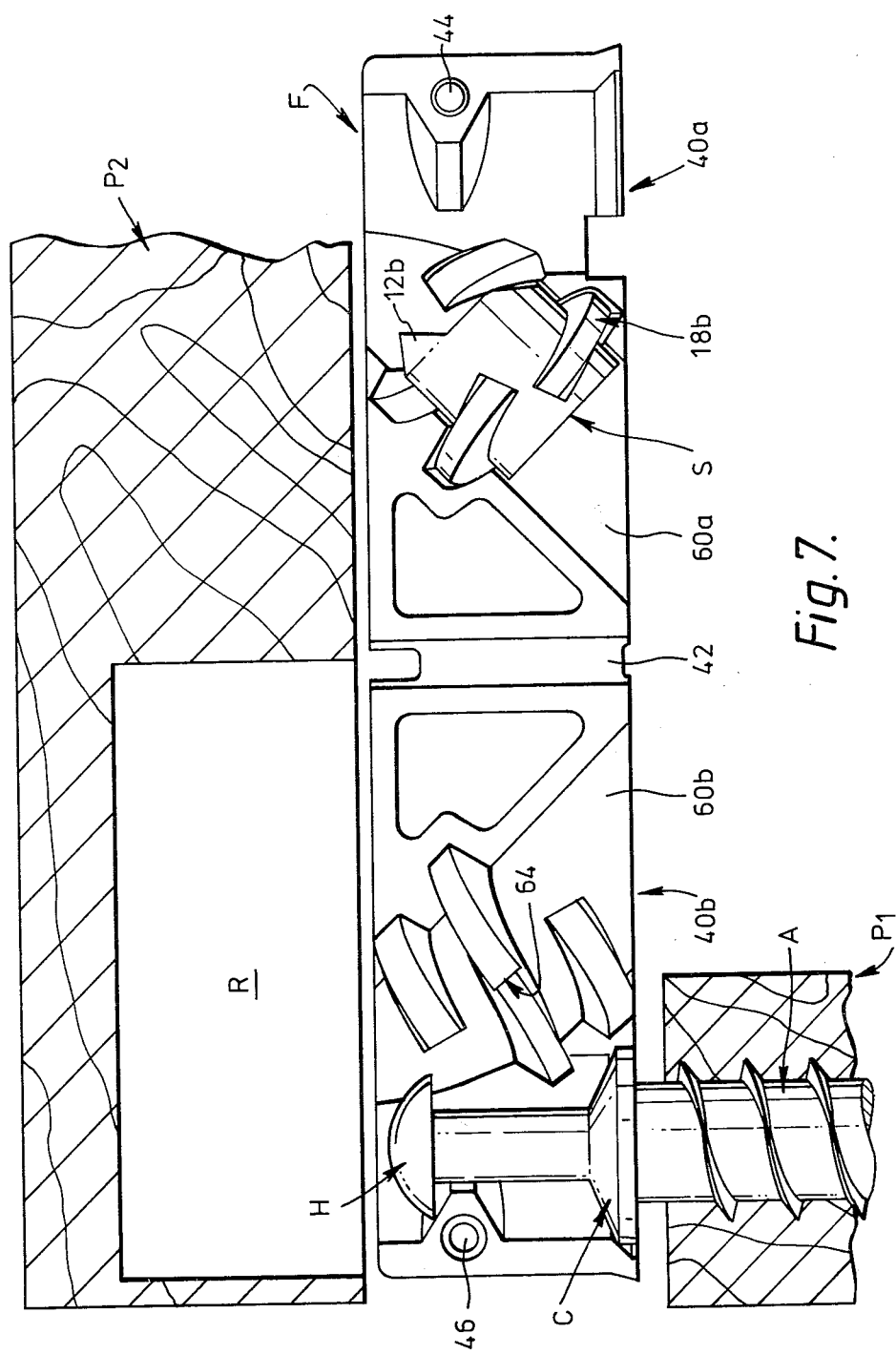

FIG. 7 schematically illustrates the manner of use of the grub screw of FIGS. 1 to 3 with the furniture fastener of FIGS. 4 to 6 in securing a pair of panels at right angles to one another.

A threaded member in accordance with the present invention is shown in FIGS. 1 to 3 in the form of a grub screw S die-cast from the zinc based metal alloy known as Mazak 5 (RTM).

The grub screw S includes a cylindrical stud 10. A leading end of the stud 10 has a central plateau 12 which on one side has a chamfer 12a and on the opposite side has a ridge 12b. A notch 14 is provided midway along the length of the ridge 12b. A trailing end of the stud 10 has a recess 16 of conventional cruciform shape for receiving a tool for applying torque to the grub screw.

The central part of the stud 10 carries a pair of ½-turn external helical threads 18a, 18b which are arranged to give a double-start. Each of the threads 18a, 18b is of symmetrical outline, when viewed in a cross-section taken transversely to its length, and includes a leading face 20 joined to a trailing face 22 by an intermediate face constituting a crest 24. The faces 20, 22 each make an angle of 15° to a line passing radially through the longitudinal axis of the stud 10.

As shown particularly clearly in FIG. 3, the crest 24 of the thread 18a is nearer to the longitudinal axis of the stud 10 at a leading end of the thread 18a (located close by the leading end of the stud 10) than at a trailing end of the thread 18a (located close by the trailing end of the stud 10). In fact, the crest 24 of the thread 18a presents a spiral outline. The crest 24 of the thread 18b, however, remains at a constant radial separation from the longitudinal axis of the stud 10, between a leading end of the thread 18b (located close by the leading end of the stud 10) and a trailing end of the thread 18b (located close by the trailing end of the stud 10). In fact, the crest 24 of the thread 18b presents a semi-circular outline.

The trailing end of the thread 18a is in the form of an abutment 26 (see FIG. 3) and is connected to the leading end of the thread 18b by a frangible web 28 (see FIG. 1).

The above-described grub screw S is suitable for use in a furniture fastener F of the kind commonly known as a clam-type knock-down fix and formed to the as-moulded condition shown in FIGS. 4 to 6 of the resilient plastics material Nylon 6.6.

It will be convenient to describe the construction of the fastener F, however, at the same time as describing the intended manner of use with reference to FIG. 7.

The fastener F includes a pair of generally semi-cylindrical members 40a, 40b connected by a hinge 42. The member 40b is to be applied to an anchor A, whose threaded part has been screwed into a first panel P₁, to locate a head H and a collar C of the anchor A. The member 40a is then folded about the hinge 42 to close the fastener F around the grub screw S and the anchor A to allow a locating spigot 44 to fasten in a locating hole 46. The closed fastener F is now of generally cylindrical shape and can be secured by circumferential barbs 48 formed thereon in a recess R of complementary shape formed in a second panel P₂.

In a preferred sequence of assembly, the members 40a, 40b are snapped together to retain the grub screw S and are then pressed into the recess, before locating the anchor A within the members 40a, 40b.

Closing the fastener F brings into alignment two bore portions 60a, 60b to form a continuous bore having a pair of full-turn internal helical threads. A first of the internal threads includes a groove 62′ in the member 40a, a groove 62″ in the member 40b, and a groove 62‴ in the member 40a. An abrupt shoulder 64 is formed midway along the length of the thread formed by the grooves 62′, 62″ and 62‴. Each section of the thread, before and after the abrupt shoulder 64, is a spiral exactly complementary in shape to the thread 18a on the grub screw 1. The second of the internal threads includes a groove 66′in the member 40b, a groove 66″ in the member 40a, and a groove 66‴ in the member 40b. The thread formed by the grooves 66′, 66″ and 66‴ is of uniform depth along its entire length. A locating groove 68 extends as shown in the member 40a between the groove 62′ and a point midway along the length of the groove 66″.

When the fastener F is closed, the thread 18a of the grub screw S is initially located entirely before the abrupt shoulder 84, the frangible web 28 is located within the locating groove 68, and the thread 18b is initially located within the groove 66′ and part of the groove 66″. Applying and turning a tool in the recess 16 of the grub screw S will break the frangible web 28 and allow the grub screw S to be screwed forward by ½-turn. The thread 18a is then located entirely after the abrupt shoulder 64, with the thread 18b being finally located within the other part of the groove 66″ and the groove 66‴.

As the abutment 26 at the trailing end of the thread 18a passes the abrupt shoulder 64 the user will feel a sudden decrease in the torque needed for screwing and might also hear an audible click.

The arrangement is such that the thread 18a on the grub screw S passes the abrupt shoulder 64 on thus fastener F immediately before the leading end of the grub screw engages the anchor A. The user is thus warned that the grub screw S has reached its desired position in which the ridge 12b locates beneath the head H of the anchor A with the notch 14 itself snapping into position against the anchor A. Any subsequent attempt to withdraw the grub screw S from the fastener F by unscrewing will be resisted by abutting engagement of the abutment 26 with the abrupt shoulder 64.

We claim:

1. A threaded member comprising an elongate shank defining a longitudinal axis, the shank having a first external helical thread including a leading end, a trailing end and a crest, and the radial separation of the crest from the longitudinal axis of the shank being less at the leading end of the first thread than at the trailing end of the first thread, with the trailing end of the first thread being in the form of an abutment, and an additional thread on said shank which overlaps said first thread substantially all of their lengths, said additional thread including a leading end, a trailing end and a crest, with the radial separation of the crest of the additional thread from the longitudinal axis of the shank remaining constant from the leading end of the additional thread to the trailing end of the additional thread.

2. A threaded member according to claim 1, in which the radial separation of the crest from the longitudinal axis of the shank never decreases during movement along the crest away from the leading end of the first thread.

3. A threaded member according to claim 2, in which the radial separation of the crest from the longitudinal axis of the shank progressively increases along the entire length of the crest as the abutment at the trailing end of the first thread is approached.

4. A threaded member according to claim 3, in which the rate of the progressive increase is uniform so that the crest presents a spiral outline when viewed from an end of the shank.

5. A threaded member comprising an elongate shank defining a longitudinal axis, the shank having a first external helical thread including a leading end, a trailing end and a crest, and the radial separation of the crest from the longitudinal axis of the shank being less at the leading end of the thread than at the trailing end of the thread, with the trailing end of the thread being in the form of an abutment, and additional thread on said shank which overlaps said first threads substantially all of their lengths, and a frangible web extending between the first thread and the additional thread.

6. A threaded member according to claim 1, in which a frangible web extends between the thread and the additional thread.

7. A threaded member comprising an elongate shank defining a longitudinal axis, the shank having an external helical thread including a leading end, a trailing end and a crest, and the radial separation of the crest from the longitudinal axis of the shank being less at the leading end of the thread than at the trailing end of the first thread, with the trailing end of the thread being in the form of an abutment, the leading end of the shank having a side ridge extending from a central plateau.

8. A threaded member according to claim 7, in which the side ridge is notched midway along its length.

9. A threaded member according to claim 1 in combination with a hinged fastener formed of a plastics material to present a pair of generally semi-cylindrical members, with each of the generally semi-cylindrical members being shaped so that together they define a bore which receives the shank of the threaded member with the bore having an internal helical thread formed in two sections which are sequentially generally complementary in shape to the external helical thread on the shank and which are separated by an abrupt shoulder, the arrangement being such that a user is given a tangible warning when the trailing end of the thread passes the abrupt shoulder.

* * * * *